250-203. CT AU 256 EX
9-73 XR 3,740,559

United States Patent [19]
[11] 3,740,559

Scanlon et al.
[45] June 19, 1973

[54] VOICE COMMUNICATION SYSTEM

[75] Inventors: Joseph C. Scanlon, Elizabeth; Alfred Brauner, Wanaque, Robert Carvalho, Englewood, all of N.J.; Cecil B. Ellis, White Plains, N.Y.

[73] Assignee: The Singer Company, New York, N.Y.

[22] Filed: June 29, 1971

[21] Appl. No.: 158,096

Related U.S. Application Data

[62] Division of Ser. No. 820,572, April 30, 1969.

[52] U.S. Cl. ................ 250/199, 250/203, 178/7.2 R
[51] Int. Cl. ................ H04b 9/00
[58] Field of Search ................ 250/199, 203, 211, 250/215, 220; 178/7.2 R; 179/1 SA

[56] References Cited

UNITED STATES PATENTS

| | | | |
|---|---|---|---|
| 796,254 | 8/1905 | Hartmann | 250/199 |
| 2,546,984 | 4/1951 | Delorhine et al. | 250/199 |
| 3,450,885 | 6/1969 | Willes | 178/7.2 |

*Primary Examiner*—Albert J. Mayer
*Attorney*—S. A. Giarratana, G. E. Oujevolk and S. M. Bender

[57] ABSTRACT

A voice communication system is provided which includes a photosensitive element, an amplifier connected to the photosensitive element, a loudspeaker connected to the amplifier, a first light beam producing device adapted to project a first light beam spot on one side of the photosensitive element, a second light beam producing device adapted to project a second light beam spot on the other side of the photosensitive element, and a speaker adapted to modulate the first light beam according to the output of a voice which it senses. The photosensitive element has a cell plate which is sandwiched between first and second radiation transmitting electrodes. The first electrode is a film of metal bonded to the cell plate. A non-ohmic photovoltaic junction is formed between the metal film and the material of the cell plate. The metal film and the cell plate have respective work functions, wherein the metal film work function is greater than the cell plate work function. The speaker is a vibratory conical member which has a portion containing a pinhole, through which the first light beam is projected so that the conical member modulates the light beam.

5 Claims, 3 Drawing Figures

VOICE COMMUNICATION SYSTEM

This is a division of Application Ser. No. 820,572, filed Apr. 30, 1969.

The invention described herein was made in the performance of work under a NASA contract and is subject to the provisions of Section 305 of the National Aeronautics and Space Act of 1958, Public Law 85-568 (72 Stat. 435; 42 USC 2457).

The present invention relates to a light detection system and more particularly to a detection system which must detect a signal under low light level conditions for beam tracking, television camera, etc.

In the R.P. Borkowski et al. U.S. Pat. Application Ser. No. 675,231, now U.S. Pat. No. 3,514,609, mention was made of the current multiplication effect resulting from the coincidence of two beams of light on opposite sides of a cell. The present invention concerns a somewhat analogous effect, termed herein the photovoltaic enhancement effect. Generally speaking, the photovoltaic enhancement effect is obtained by illuminating coincident spots on a semiconductor by appropriate radiation while the semiconductor is operated in a photovoltaic mode.

One of the disadvantages of using semiconductors in the coincident beam current multiplication type of application is the slow rise and decay time of the semiconductor. In the present invention, use is made of the enhancement effect previously detected in photoconductors by operating semiconductors in the photovoltaic mode and use is made of advantages that this latter mode has over the former.

Among the features of the present invention are, first of all the identification of the existence of the photovoltaic enhancement effect. Secondly, there is a fast rise and decay time for low light levels, e.g., comparable signals give orders of magnitude slower response for the semiconductor operated with measurable bias voltages in the photoconductive mode. Third, the exhibition of an enhancement effect for fast chopping.

Briefly stated, the present invention contemplates the detection of a signal for using a photosensitive element with dual side electrodes transparent to selective radiation; amplifier means connected to the photosensitive element and signal utilization means connected to the amplifier. The photosensitive element is aligned so that one side of the photosensitive element can receive the signal thereon as a light beam spot. Scanning means are provided for scanning the other side of the photosensitive element with a light beam spot. The coincidence of said spots on opposite sides of said photosensitive element causes a detectable photovoltaic effect which is amplified by the amplifier so as to be used by the utilization means. The photosensitive element operates in the absence of any electrical excitation applied thereto.

The invention as well as the objects and advantages thereof will be more apparent from the follwoing detailed description taken together with the accompanying drawing in which.

Figure 1:
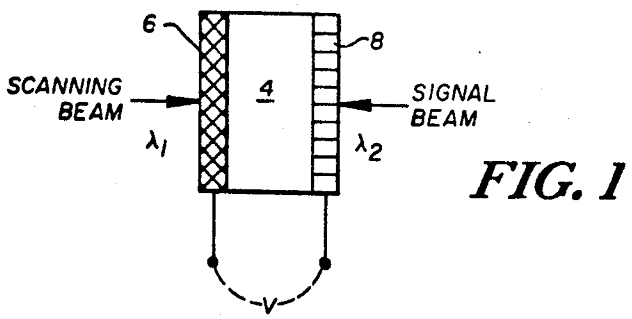
FIG. 1 is a schematic illustration of a semiconductor useful for the purposes of the present invention.

In the present invention, use is made of a cadmium sulfide cell plate 4 shown in FIG. 1, having a thin metallic film 6, (Au for example), on one side of the cell and a counter electrode 8, such as NESA conducting glass $SnO_2$, on the other side. A signal is provided as a light spot on one electrode, while a detecting scanning spot scans the opposite side of the plate cell. The metal film of gold 6, and the cell plate of cadmium sulfide 4, together form a non-ohmic photovoltaic junction therebetween because the work function of the gold film 6 is greater than the work function of the cadmium sulfide cell plate 4. The non-ohmic junction is necessary when using only two aligned light spots for generating the voltage.

At the outset, it is necessary to explain what is meant by the term "photovoltaic enhancement effect." This is a voltage enhancement which results when small illuminated spots on opposite sides of a photosensitive cell are brought into spatial opposition, with no applied electric field. If the photovoltages obtained by illuminating with either spot alone are $V_R$ and $V_L$ and the photovoltage obtained (at the same field) by simultaneous illumination is $V_{R,L}$, it develops that an enhancement effect is produced which is considerably greater than the sum of the individual voltages, e.g., $M = V_{R,L}/V_R+V_L >>1$. Note that $V_{R,L}$ does not necessarily imply large voltages since $V_R$ and $V_L$ individually may be small. Therefore large $M$ values are not dependent on large voltages. Herein, the letter $M$ is used to indicate this enhancement effect and $M$ values as high as 25 for the photovoltaic mode have been detected. At green light intensities which create about 2 millivolts across the cell, the rise and decay times for photovoltage across a 75$\mu$ cadmium sulfide layer are at least twenty times shorter than are the photocurrent rise and decay times, the latter being measured under the same ambient conditions of illumination.

Although the photovoltaic effect is less than the photoconductive contributions, the higher blue-green frequencies disclose interesting situations. With a cell connected across a Tektronic 545 oscilloscope having 1 megohm internal resistance, a photovoltaic enhancement is observed. The voltage amplitude in millivolts for advantageous spectral regions is given in Table I.

TABLE I

| λ 450 mμ | λ 500 mμ | λ 633 mμ | λ 730 mμ | Spot Location |
|---|---|---|---|---|
| 0.1 mv | 0.2 mv | 0.5 mv | 0.9 mv | NESA glass side of CdS cell |
| 0.1 mv | 0.1 mv | 0.3 mv | 0.3 mv | Evaporated Electrode side of CdS cell |
| 5.0 mv | 2.0 mv | 1.0 mv | 2.0 mv | Both sides of CdS cell |

It is seen that beams on both sides cause a 25 X increase in voltage for the shortest wavelength case, at the illumination level used, which was about 0.2 μw through a pinhole mask of 0.4 mm diameter.

The rise and decay times are significant since they are much faster than those obtained for the photoconductive case at the same level of illumination as shown in Table II.

TABLE II

| Photovoltaic (both sides illuminated) | | | Photoconductive (1v bias, both sides illuminated) | |
|---|---|---|---|---|
| λ 450 mμ | λ 500 mμ | λ 633 mμ | λ 500 mμ | λ 633 mμ |
| τ≈0.3 sec rise | ≈0.1 sec | <0.1 sec | ≈2.0 sec | 0.8 sec |
| τ≈0.002 sec decay | ≈0.002 sec | <0.1 sec | ≈0.1 sec | 1.2 sec |

The decay times for the photovoltaic cases are actually faster than 0.002 sec, which is the reaction time of the optical shutter used in the experiment to stop and start the illumination.

An experiment was conducted which established that even at a 3300 c/s chopping rate, the mechanical limitation of a laboratory slotted disc, a large photovoltaic enhancement was detected. This finding was confirmed by the operation of the voice communcation system (ibid, examples) where high frequency audio components were transmitted.

An experiment to check on the spatial characterists of the photovoltaic effect showed that the photovoltaic enhancement drops to $M = 1$ the classical instance where the voltages become additive for the case when the illuminated pinholes in the masks over the CdS surfaces are not opposite one another.

The following examples are given to provide those skilled in the art a better appreciation of the invention.

Figure 2:
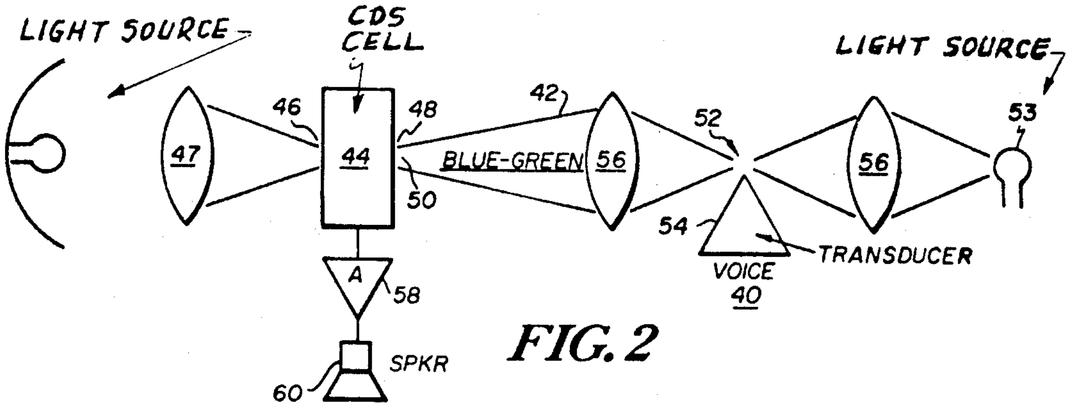
FIG. 2 shows in block diagram how the present inventive concept can be used for human voice transmission; and, FIG. 3 depicts a block diagram of a low light level television camera.

Example I (FIG. 2) — Voice Communication

The greater bandwidth which is obtained in the photovoltaic enhancement effect has been illustrated by the successful operation of a voice modulated communications system. The human voice 40 was transmitted over a blue-green light beam 42 using a CdS detector 44 operated in the photovoltaic mode. A light spot 46 of constant intensity was projected by projection means 47 on one side 48 of the detector 44, a second spot of light 50 was modulated by a vibrating pinhole 52 attached to a transducer 54 which was driven by a microphone and amplifier. The second light spot 50 was projected by optics 56. The speaker contained a blue-green light source 53. The interruptions of this second beam produced photovoltaic enhancement, the output of which was fed into a second amplifier 58 and loud speaker system 60. The total energy of the two light beams was about $10^{-7}$ watts.

Figure 3:
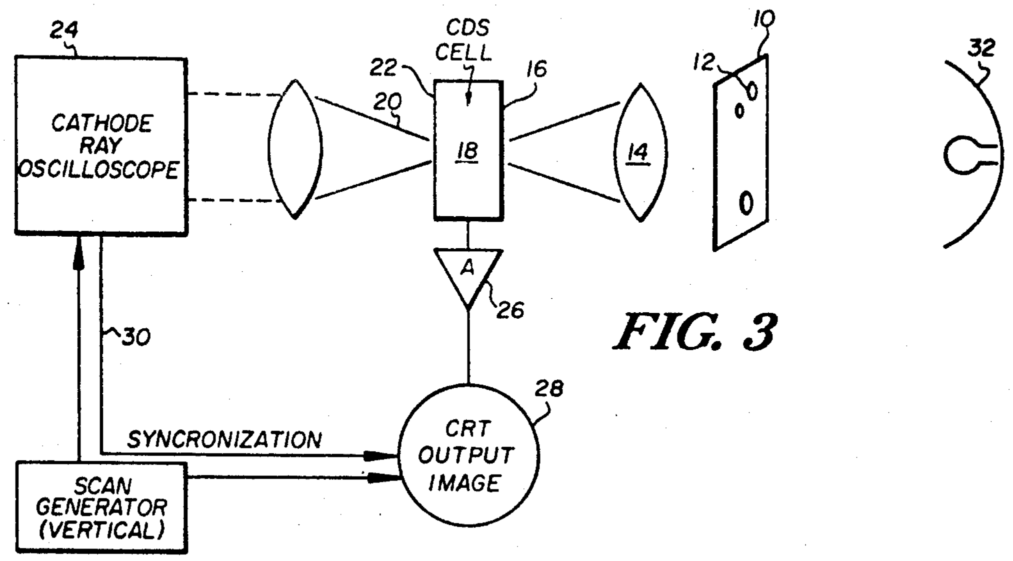

Example II (FIG. 3) — Low Light Level Television Camera

A second application of the photovoltaic enhancement effect was demonstrated for a low light level television camera system. An object 10 consisting of three asymmetric holes 12 in a piece of black paper was imaged by a lens system 14 on one side 16 of the CdS detector 18. A rectangular raster scan of green light 20 was projected on the opposite side 22 by a scan generator 24, the field of scan was about 1 cm × 1 cm. When the scanning light was coincident with the hole pattern, an enhanced electrical signal was produced. The output of the detector 18 was amplified in an amplifier 26 and the modulation of the electron beam varied the intensity of the phosphor spot of an oscilloscope 28. The beam from this oscilloscope was synchronized by a feedback line 30 with the raster scan of the light beam from the scan generator 24. A true image of the object was observed on this oscilloscope.

We claim:

1. A voice communication system, comprising in combination:

speaker means including a conical member having a portion with a pinhole;

blue-green light giving means arranged next to said speaker means so that said light shall be modulated by the vibration of said pinhole, and optical means to focus said light as a light beam spot;

a photosensitive element disposed to receive said focused light on one side thereof, said photosensitive element comprising a cell plate sandwiched between first and second radiation transmitting electrodes, said first electrode being a film of metal bonded to said cell plate, the metal of said film and the material of said cell plate being selected so as to form a non-ohmic photovoltaic junction therebetween, said film and said cell plate having respective work functions, said film work function being greater than said cell plate work function;

optical means to focus another light spot of constant intensity on the other side thereof so that said two spots on said two sides coincide;

amplifier means connected to said element; and loudspeaker means connected to said amplifier means to reproduce the interruptions of said first light beam spot as sound.

2. A voice communication system comprising in combination:

a photosensitive element comprising a cell plate sandwiched between first and second radiation transmitting electrodes, said first electrode being a film of metal bonded to said cell plate, the metal of said film and the material of said cell plate being selected so as to form a non-ohmic photovoltaic junction therebetween, said film and said cell plate having respective work functions, said film work function being equal to or greater than said cell plate work function;

amplifier means connected to said element;

loudspeaker means connected to said amplifier means;

first light beam producing means adapted to project a first light beam spot on one of said electrodes on one side of said element;

second light beam producing means adapted to project a second light beam spot on the other of said electrodes on the other side of said element and in substantial coincidence with said first light beam spot; and modulation means including speaker means for sensing the output of a voice, said modulation means being adapted to modulate said first light beam according to said voice output.

3. A voice communication system according to claim 2, wherein said cell plate is composed of cadmium sulfide and said first electrode is composed of gold.

4. The voice communication system according to claim 3, wherein said speaker means includes a vibratory conical member having a portion containing a pinhole.

5. The voice communication system according to claim 4, wherein said first light beam producing means includes a blue-green light giving means arranged next to said speaker means so that said light shall be modulated by the vibration of said pinhole, and includes optical means arranged to focus said first light beam to pass through said pinhole and to form said first light beam spot.

* * * * *